US009063974B2

(12) United States Patent
Aingaran et al.

(10) Patent No.: US 9,063,974 B2
(45) Date of Patent: Jun. 23, 2015

(54) HARDWARE FOR TABLE SCAN ACCELERATION

(71) Applicant: Oracle International Corporation, Redwood Shores, CA (US)

(72) Inventors: Kathirgamar Aingaran, San Jose, CA (US); Garret F. Swart, Palo Alto, CA (US); Sanjiv Kapil, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 13/778,009

(22) Filed: Feb. 26, 2013

(65) Prior Publication Data
US 2014/0095468 A1    Apr. 3, 2014

Related U.S. Application Data

(60) Provisional application No. 61/709,142, filed on Oct. 2, 2012.

(51) Int. Cl.
*G06F 17/30* (2006.01)
*G06F 9/54* (2006.01)
*G06F 9/38* (2006.01)
(Continued)

(52) U.S. Cl.
CPC .... *G06F 17/30442* (2013.01); *G06F 17/30483* (2013.01); *G06F 9/546* (2013.01); *G06F 9/3867* (2013.01); *G06F 12/0804* (2013.01); *G06F 12/12* (2013.01); *G06F 15/17331* (2013.01); *G06F 12/082* (2013.01); *G06F 12/1408* (2013.01); *G06F 17/30498* (2013.01); *G06F 21/6209* (2013.01); *G06F 17/30595* (2013.01); *H04L 69/14* (2013.01);
(Continued)

(58) Field of Classification Search
USPC ................................. 707/706, 713
See application file for complete search history.

(56) References Cited

U.S. PATENT DOCUMENTS 5,761,653 A * 6/1998 Schiefer et al. ............... 707/713
5,974,408 A * 10/1999 Cohen et al. ......................... 1/1
(Continued)

FOREIGN PATENT DOCUMENTS

EP    1 111 500 A1    3/1996

OTHER PUBLICATIONS

Vaidya et al., "A Novel Multicontext Coarse-Grained Reconfigurable Architecture (CGRA) for Accelerating Column-Oriented Databases", AMC Transactions on Reconfigurable Technology and Systems, vol. 4. No. 2 Article, Publication date: May 2011, 30 pages.
(Continued)

*Primary Examiner* — Kim Nguyen
(74) *Attorney, Agent, or Firm* — Hickman Palermo Becker Bingham LLP; Daniel D. Ledesma

(57) ABSTRACT

Techniques for processing a query are provided. One or more operations that are required to process a query are performed by a coprocessor that is separate from a general purpose microprocessor that executes query processing software. The query processing software receives a query, determines one or more operations that are required to be executed to fully process the query, and issues one or more commands to one or more coprocessors that are programmed to perform one of the operations, such as a table scan operation and/or a lookup operation. The query processing software obtains results from the coprocessor(s) and performs one or more additional operations thereon to generate a final result of the query.

25 Claims, 5 Drawing Sheets

(51) Int. Cl.
*G06F 12/08* (2006.01)
*G06F 12/12* (2006.01)
*G06F 15/173* (2006.01)
*G06F 12/14* (2006.01)
*G06F 21/62* (2013.01)
*H04L 29/06* (2006.01)

(52) U.S. Cl.
CPC ... *G06F 17/30501* (2013.01); *G06F 17/30519* (2013.01); *Y02B 60/188* (2013.01)

(56) References Cited

U.S. PATENT DOCUMENTS

| | | | |
|---|---|---|---|
| 6,047,081 A | | 4/2000 | Groezinger et al. |
| 6,349,310 B1 * | | 2/2002 | Klein et al. ............... 707/703 |
| 6,826,522 B1 | | 11/2004 | Moller et al. |
| 7,737,983 B2 * | | 6/2010 | Brothers et al. ............ 345/522 |
| 7,877,379 B2 * | | 1/2011 | Waingold et al. ........... 707/718 |
| 8,049,760 B2 | | 11/2011 | Jiao et al. |
| 8,260,803 B2 * | | 9/2012 | Hsu et al. ................... 707/769 |
| 8,666,970 B2 * | | 3/2014 | Albrecht et al. ............ 707/719 |
| 2007/0091102 A1 * | | 4/2007 | Brothers et al. ............ 345/506 |
| 2008/0114724 A1 | | 5/2008 | Indeck et al. |
| 2008/0162876 A1 | | 7/2008 | Bou-ghannam et al. |
| 2009/0037700 A1 | | 2/2009 | Graham |
| 2012/0191698 A1 * | | 7/2012 | Albrecht et al. ............ 707/718 |
| 2014/0095534 A1 | | 4/2014 | Aingaran et al. |
| 2014/0095748 A1 | | 4/2014 | Aingaran et al. |

OTHER PUBLICATIONS

Weinhardt, Markus, "Compilation and Pipeline Synthesis for Reconfigurable Architectures", 1997, 8 pages.
Schmit et al., "PipeRench: A Virtualized Programmable Datapath in 0.18 Micron Technology", dated 2002, 4 pages.
Park et al., "Polymorphic Pipeline Array: A Flexible Multicore Accelerator with Virtualized Execution for Mobile Multimedia Applications", Dated Dec. 12, 2009 11 pages.
Silva et al., "Using a Tighly-Coupled Pipeline in Dynamically Reconfigureable Platform FPGAs", dated May 2003, 4 pages.
Dynamic Scheduling Techniques, http://www.cs.iastate.edu/~prabhu/Tutorial/PIPELINE/dynamSchedTech.html, printed on Jul. 4, 2012, 2 pages.
CCCP: Accelerator Virtualization, http://cccp.eecs.umich.edu/research/virtual.php, printed on Jul. 4, 2012, 3 pages.

* cited by examiner

400

ZIP CODES

| | |
|---|---|
| 0 | 00000 |
| . | . |
| . | . |
| . | . |
| 1 | 10101 |
| 0 | 10102 |
| . | . |
| . | . |
| . | . |
| 1 | 45340 |
| 0 | 45341 |
| . | . |
| . | . |
| . | . |
| 1 | 99998 |
| 1 | 99999 |

*FIG. 4*

HARDWARE FOR TABLE SCAN ACCELERATION

PRIORITY CLAIM AND RELATED CASE

This application claims priority to U.S. Provisional Application No. 61/709,142, filed Oct. 2, 2012, the contents of which are incorporated by reference, as if fully set forth herein under 35 U.S.C. §119(e).

This application is related to U.S. patent application Ser. No. 13/778,013, filed Feb. 26, 2013, the contents of which are incorporated by reference, as if fully set forth herein.

FIELD OF THE INVENTION

The present invention relates generally to processing a query and, more specifically, to using custom hardware in one or more coprocessors to perform one or more operations that are required to process the query.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Queries issued to a database typically target one or more one or more database objects, such as relational tables. Many times, accessing data organized in a relational table involves scanning the relational table or at least a portion thereof. A common SQL query is one that requires a filter on a database table, such as the following:
   select EMPLOYEE from T_EMPLOYEES where HIRE_YEAR='2012'

In this example, that database table T_EMPLOYEES is searched for all the employees who were hired in 2012. This search (or "scan") is done by software running on one or more microprocessors that execute a series of instructions to search through the table for the specified value, which is '2012' in this example. The first step is typically the performance bottleneck when running analysis applications on a large database, since this step has to run on the entire table, which may be several terabytes large. Subsequent steps will work on the filtered subset of the first scan step that meets the criteria set in the scan (employees hired in 2012 in the above example). Therefore, the number of rows that a machine can filter per unit of time is an important performance metric for the machine. This metric is referred to as the "scan rate."

Approaches for processing queries, such as queries that involve scanning a table, have relied on software techniques, where the software is executed (or "runs") on a general purpose microprocessor.

BRIEF DESCRIPTION OF THE DRAWINGS

In the drawings:

FIG. 4 is a block diagram that depicts a portion of an example lookup vector, in an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a scan operation or a lookup operation associated with a query is implemented in hardware, such as a coprocessor that is located on the same chip as a general purpose microprocessor. In this way, the scan operation is performed by custom hardware whereas other portions of the query are handled by the general purpose microprocessor running software. One advantage of having different hardware components perform different operations is that custom hardware is better able to handle the large volume of data that is required for a scan operation or a lookup operation. Also, custom hardware frees up the general purpose microprocessor and associated cache(s) to work on other parts of the query or even other tasks that are unrelated to the software that processes the query.

Embodiments of the invention are not limited to any particular microprocessor or graphic processing unit (GPU).

The following examples refer to a table as a data object that is scanned. However, all embodiments are not limited to tables. Data objects other than tables may be scanned.

System Overview

Figure 1:
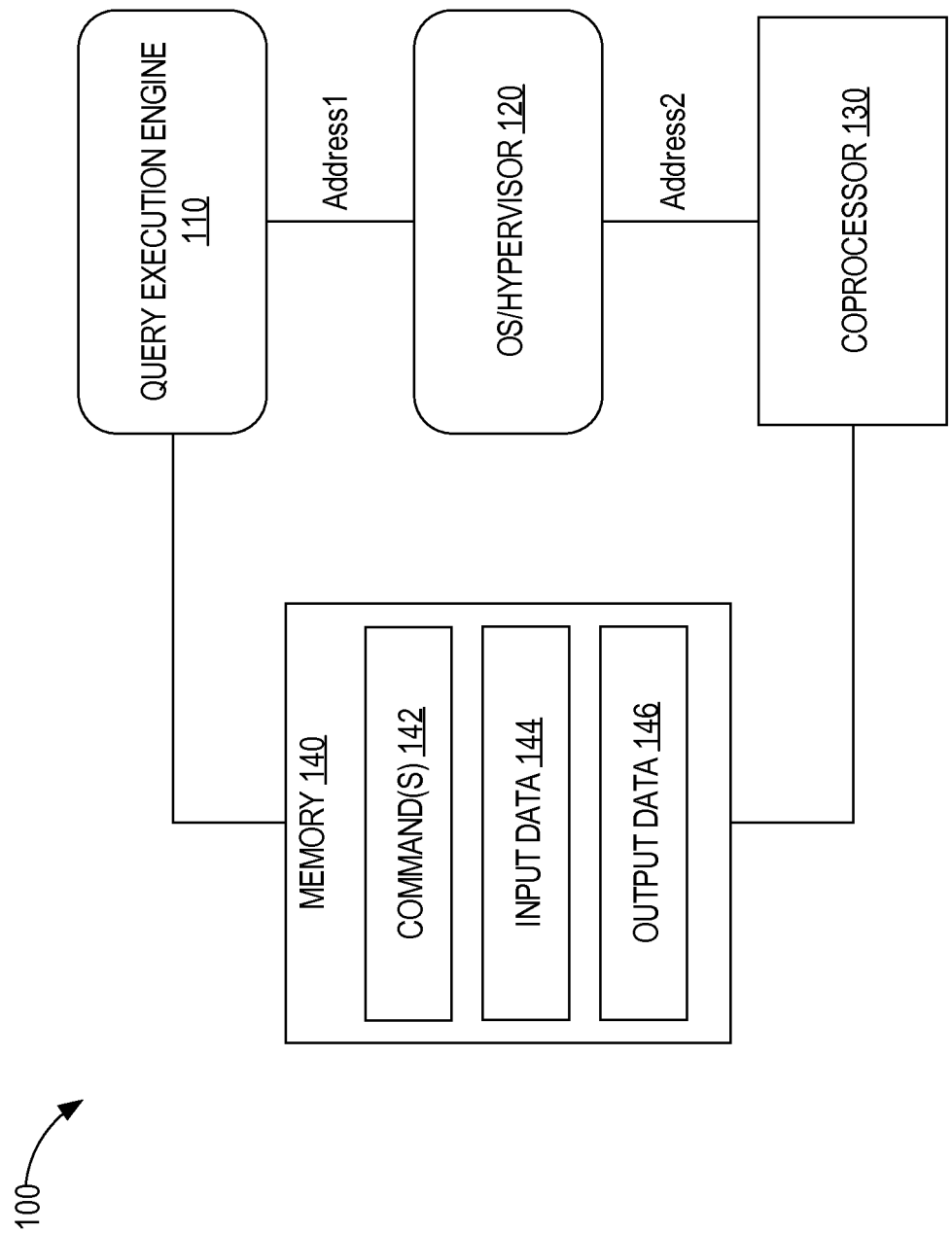
FIG. 1 is a block diagram that depicts an example computer system for accelerating a table scan, according to an embodiment.

FIG. 1 is a block diagram that depicts an example computer system 100 for accelerating the processing of a query, according to an embodiment. Computer system 100 includes a query execution engine 110, an OS/hypervisor 120, a coprocessor 130, and memory 140. Although only a single coprocessor 130 is depicted, system 100 may include multiple coprocessors.

Query execution engine 110 and hypervisor 120 are programs that reside in memory (e.g., DRAM and/or cache memory) and include instructions that are executed by a general purpose microprocessor. Query execution engine 110 comprises one or more software components and may communicate with one or more other software components that are not part of query execution engine 110 in order to execute a query to generate a result of the query. Query execution engine 110 may be configured to rewrite a query (e.g., a SQL query) to generate a rewritten query that query execution engine 110 is able to execute. Alternatively, another software component receives an original query, generates a rewritten query based on the original query, and passes the written query to query execution engine 110 for processing.

Non-limiting examples of types of queries that query execution engine 110 may be configured to process include SQL queries and XML queries, such as XPath queries and XQuery queries. At least one type of query that query execution engine 110 is configured to process is a query that requires a scan of an object, or a portion thereof. As noted previously, a non-limiting example of an object that is scanned is a relational table that is logically organized in one or more columns and multiple rows. While data may be logically organized in a single table, the data may be organized very differently in persistent storage, such as a hard disk drive or a flash memory device. For example, the data of a table may be partitioned or different columns of a table may be stored in very different storage locations.

Hypervisor 120 acts as an interface between query execution engine 110 and coprocessor 130. In other words, commands issued by query execution engine 110 to coprocessor 130 are issued over hypervisor 120. Thus, query execution engine 110 issues commands on the hypervisor interface by making API calls to OS/hypervisor 120.

A hypervisor is a hardware virtualization technique that allows multiple operating systems ("guests") to run concurrently on a host computer. A hypervisor presents, to guest operating systems, a virtual operating platform and manages the execution of the guest operating systems. Multiple instances of a variety of operating systems may share the virtualized hardware resources. Hypervisors may be installed on server hardware, with the function of running guest operating systems that, themselves, act as servers.

One type of hypervisor runs directly on a host's hardware to control the hardware and to manage guest operating systems. A guest operating system thus runs on another level above the hypervisor. Another type of hypervisor runs within a typical operating system environment. With the hypervisor layer as a distinct second software level, guest operating systems run at the third level above the hardware. In other words, the first type of hypervisor runs directly on the hardware while the second type of hypervisor runs on another operating system, such as FreeBSD, Linux, or Windows.

Thus, although element 120 is labeled as "OS/Hypervisor," an operating system and a hypervisor are different entities. For purposes of this description, an OS and hypervisor are treated the same. The following references to element 120 will be "hypervisor 120."

Although hypervisor 120 is depicted as part of computer system 100, in one embodiment, computer system 100 does not include a hypervisor. In that embodiment, query execution engine 110 issues commands directly to coprocessor 130 without first requiring processing by any other software component, other than an operating system (not depicted) of computer system 100.

Coprocessor 130 is a hardware element that is programmed to perform one or more tasks separate from the tasks performed by the general purpose processor that executes query execution engine 110 and hypervisor 120. While coprocessor 130 is separate from the general purpose processor that executes query execution engine 110, coprocessor 130 may be viewed as part of query execution engine 110 in that coprocessor 130 performs one or more tasks that were previously performed by query execution engine 110.

In an embodiment, coprocessor 130 at least performs the task of comparing a specified target value (or target range of values) against a series of input values from a table. This task is referred to as a scan operation and is described in more detail below. In an embodiment, coprocessor 130 is capable of comparing multiple specified target values (or multiple specified target ranges) against a series of input values or data elements from a table.

In another embodiment, coprocessor 130 at least performs the task of determining whether one or more values exist in a particular set of values. The one or more values may be used to index into the particular set of values so that the particular set of values do not need to be scanned for each value of the one or more values. In this embodiment, coprocessor 130 is programmed to efficiently perform a lookup operation, which is described in more details below.

Other than initial parameters established or dictated by query execution engine 110, coprocessor 130 performs a scan operation and/or a lookup operation without intervention from query execution engine 110 or any other software until the scan operation or lookup operation (indicated by the initiating command) completes. At that point, coprocessor 130 signals to query execution engine 110 that results of the operation are available. The signal may be in the form of setting a flag. Hypervisor 120 may use this signal to insert new commands into a command queue of coprocessor 130.

In an embodiment, coprocessor 130 is programmed to handle different data types/formats and element sizes. For example, coprocessor 130 may process data that is in a string format, a date format, or a number (e.g., integer or float) format. Also, the size of a data element that coprocessor 130 processes may be a particular number of bits (e.g., 7 bits) or a particular number of bytes (e.g., 2-bytes). Furthermore, data elements from a particular source (such as a table) may be variable length or fixed length. In an embodiment, a data element that coprocessor 130 receives from an object (such as a table) may be of one size and coprocessor 130 performs an operation to reduce or increase the size of the data element, such as removing one byte from the data element, adding 9 bits to the data element or decompressing the data element, before performing, for example, a comparison of the data element with another data element.

In an embodiment, coprocessor 130 resides on-chip, that is, on the same chip as a general purpose microprocessor that executes query execution engine 110. Coprocessor 130 includes (a) a memory interface that streams table data (or other data) from on- or off-chip memory to coprocessor 130 and (b) a compute block that performs a scan operation and/or a lookup operation. For example, in the case of the scan operation, the compute block acts on the table data to determine if a specified value, or a range of values, occurs in the table data. Thus, a set of comparators is used to determine if each element of an incoming stream is equal to a searched-for value or lies in a searched-for range of values. Each comparator in the set of comparators may perform a comparison operation at the same time. Thus, coprocessor 130 may perform multiple comparison operations simultaneously. In an embodiment, coprocessor 130 is configured to perform multiple types of comparisons, such as one 4-byte comparison, two 2-byte comparisons, four 1-byte compares, and/or one 2-byte and one 1-byte comparison. Coprocessor 130 sends results of a search to on-chip memory or off-chip memory through the memory interface.

As depicted in FIG. 1, memory 140 stores commands 142, input data 144, and output data 146. A command reflected in commands 142 refers to (1) a location in memory 140 that stores at least a portion of input data 144 and (2) a location in memory 140 that results (generated by coprocessor 130) of the operation(s) that correspond to the command will be stored.

In an embodiment, coprocessor 130 includes a command queue that stores one or more addresses of one or more commands. When not busy, coprocessor 130 selects one or more addresses (inserted by hypervisor 120) from the command queue in order to retrieve the one or more commands (e.g., reflected in commands 142) from memory (e.g., memory 140).

Coprocessor Control Block

In an embodiment, query execution engine 110 includes instructions that, when executed by a general purpose microprocessor (not depicted), causes generation of a coprocessor control block (CCB). A CCB is a data structure that represents a command issued by query execution engine 110 and that includes data that coprocessor is configured to read and process. In an embodiment, a CCB includes command type data that indicates the type of operation coprocessor 130 is to perform and one or more operands that correspond to the operation indicated by the command type data. If coprocessor 130 only performs one operation, then command type data may not be an available operand in a CCB. Alternatively, coprocessor 130 may ignore the command type data if coprocessor is configured to perform only one operation.

The command type data indicates which logic coprocessor 130 will use to process a command. Thus, different command types correspond to different logic implemented by coprocessor 130. For example, a scan operation requires coprocessor 130 to execute first logic while a lookup operation requires coprocessor 130 to execute second logic that is different than the first logic.

An operand indicated in a CCB may be one of two types: an immediate operand or an indirect operand. An immediate operand is an operand that can be used immediately by a coprocessor when the coprocessor performs the operation without first requiring translation of the operand, such as a memory lookup. An example of an immediate operand in the context of a scan operation is a 4-byte integer that is used to perform a comparison against data elements from table data. An indirect operand is an operand that must first be translated or looked up before the coprocessor can perform the designated operation. An example of an indirect operand is a physical address that indicates where (e.g., in memory 140) table data is stored for the coprocessor to perform the operation, whether a scan operation or a lookup operation.

In the context of a scan operation, the operands (of the scan operation) indicated in a CCB include (a) comparison data that indicates data that is used to perform a comparison against data from table data and (b) location data that indicates where the table data is located (e.g., input data 144 in memory 140).

Comparison data may be any type of data, such as a number, a date, a character, or a string. Comparison data may be a single value and/or a range of values. Additionally, comparison data may indicate multiple values and/or multiple ranges of values. For example, a query may request to view names of employees who make below $30,000 and employees who make between $100,000 and $130,000. In this example, comparison data indicates a range of 0-30,000 and a range of 100,000-130,000.

Location data may be a single address or a multiple addresses, such as a starting address and an ending address or a starting address and an offset from the starting address. Each address indicated in the location data may be a virtual address, a real address, or a physical address. In an embodiment, hypervisor 120 replaces location data indicated in a CCB with second location data. For example, a (e.g., guest) operating system identifies the location data indicated in a CCB, where the location data is a virtual address and replaces the virtual address with a real address. The operating system then sends the CCB to hypervisor 120. Hypervisor 120 looks up, in a mapping table, a physical address that is mapped to the real address, and replaces, in the CCB, the real address with the physical address.

In an embodiment, a CCB also includes output location data that indicates where coprocessor 130 is to send a result of performing an operation indicated by the CCB. In FIG. 1, the output location data would point to output data 146 in memory 140. This may be helpful if multiple microprocessors are integrated on the same chip and each microprocessor has its own private cache. Thus, if a particular general purpose microprocessor that executes query execution engine 110 is one of multiple general purpose microprocessors on the same chip and each is microprocessor is associated with different (e.g., L3) cache, then query execution engine 110 may specify, as a parameter in a CCB, a cache that is adjacent to or near the particular general purpose microprocessor. Thus, instead of coprocessor 130 sending results of an operation to RAM, coprocessor 130 may send (based on output location data indicated in the CCB) the results not only to cache, but to a specific cache that is "closest" to query execution engine 110. In this way, query execution engine 110 is not required to request the results (a) from RAM, (b) from another microprocessor's (or core's) cache, or (c) from shared cache that is shared among multiple cores, each which may be much slower than accessing data from a microprocessor's own (private) cache. Instead, query execution engine 110 is allowed to dictate where results of operations performed by one or more hardware elements (i.e., coprocessors in this embodiment) will be stored.

Coprocessor

Once coprocessor 130 receives a command (e.g., in the form of a CCB) over an interface of hypervisor 120 (or directly from query execution engine 110), coprocessor 130 executes the command asynchronous to the thread of query execution engine 110 issuing the original command. If coprocessor 130 receives multiple commands, then coprocessor 130 may schedule the multiple commands for execution in a round robin fashion. Some commands may be executed in parallel.

In an embodiment, input data (e.g., relational data) for a command is fetched over an interface (to query execution engine 110) and results of a command (i.e., results that coprocessor 130 generates based on the input data) are written out over the interface.

In an embodiment, coprocessor 130 causes a completion status to be written out, over the interface at the end of each command, to a completion data structure in the interface. Query execution engine 110 may use the completion data structure to resynchronize with one or more threads of query execution engine 110.

Figure 2:
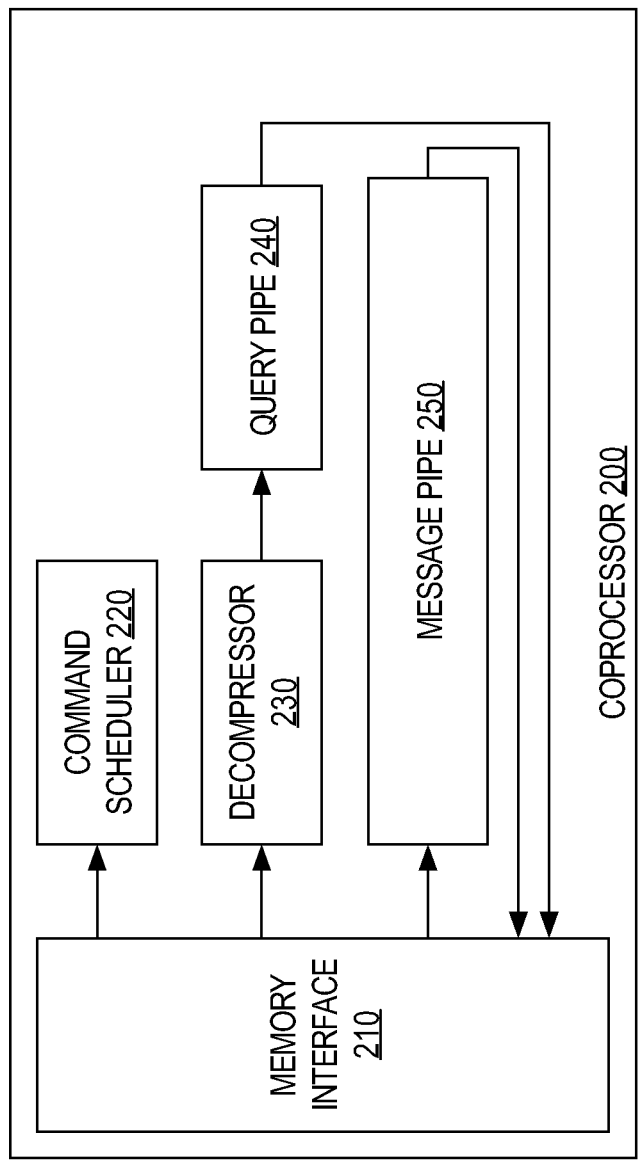
FIG. 2 is a block diagram that depicts an example coprocessor, according to an embodiment.

FIG. 2 is a block diagram that depicts an example coprocessor 200, according to an embodiment. Coprocessor 200 may be coprocessor 130 in FIG. 1. Coprocessor 200 includes a memory interface 210, a command scheduler 220, a decompressor 230, query pipe 240, and a message pipe 250. Message pipe 250 handles memory copies and message passing. Query pipe 240 handles one or more query commands, such as a scan command or a lookup command, after decompressor 230 decompresses compressed input data (e.g., data from a relational table).

Decompressor 230 may be configured to decompress only data that is compressed in a single format. Alternatively, decompressor 230 may be configured to decompress data that is compressed in one format and other data that is compressed in another format. In an embodiment, coprocessor 200 does not include decompressor 230. Decompression may not be necessary if the data that coprocessor 200 receives is not compressed (e.g., is already decompressed) when coprocessor 200 receives the data. Also, decompression may not be necessary even for compressed data if coprocessor 200 is configured to operate directly on the compressed data without having to first decompress the compressed data.

Each of pipes 240 and 250 is associated with a different set of command queues and, optionally, command formats. Hypervisor 120 is configured to ensure that commands (reflected in CCBs) are directed to the command queue of the correct pipe. A flag bit in a CCB may indicate if the CCB is a message command or a query command.

Each of pipes 240 and 250 may be multithreaded and capable of executing multiple commands at a time. The degree of multithreading is not exposed to software. Command scheduler 220 may schedule the commands on available threads on the assumption the commands are parallelizable. If a given command needs to be serialized behind another command, then the two commands may be placed in the same command queue and the appropriate serializing flags may be set in both commands.

Although not depicted, coprocessor 200 comprises a certain amount of memory to store data as the data is streamed through memory interface 210 or to store data that is used in a lookup operation, such as a lookup vector, an example of which is a Bloom filter. The size of the memory of coprocessor 200 may be quite small (e.g., 4 KB) due to modern chips that consist largely of one or more caches for the main core(s) or general purpose microprocessor(s).

While query execution engine 110 "views" table data relational and performs operations as such, coprocessor 200 only "sees" or operates on vectors or single dimensional arrays of data. In other words, coprocessor 200 does not "view" multiple columns or row identifiers. Rather, coprocessor 200 is agnostic when it comes to how the data is logically organized or stored. Therefore, in providing instructions to coprocessor 200, query execution engine 110 ensures that the output of any operations performed by coprocessor 200 is stored in a particular order. If not, the query execution engine 110 would not know which portion of the table to which the output corresponds. One way in which ordering is preserved is for query execution engine 110 to keep track of which set of table data corresponds to which CCB, where each CCB includes a unique CCB identifier. Then, the output generated by coprocessor 200 based on a particular CCB includes the identifier for that particular CCB to allow query execution engine 110 to determine to which portion of the logical table the output corresponds. For example, query execution engine 110 may store association data that associates rows 1001-2000 of table Employee with CBB identifier 432899. Coprocessor 200 receives and processes a CCB with identifier 432899 to generate output that is stored at a certain location.

Alternatively, instead of keeping track of a CCB identifier, query execution engine 110 stores association data that associates table data that indicates a portion of a table (e.g., rows 1001-2000 of table Employee) with output location data (e.g., physical address 1298737+4 KB) that indicates where output generated by coprocessor 200 is to be stored. Later, when query execution engine 110 examines the output stored at that storage location, query execution engine 110 uses the association data to determine which portion of the table corresponds to that output. Thus, query execution engine 110 can keep track of the order of the output even though coprocessor 200 operates on different portions of the table at different times and even though query execution engine 110 might instruct multiple coprocessors to operate on different portions of the table, which operations might be performed concurrently.

Processing a Query

Figure 3:
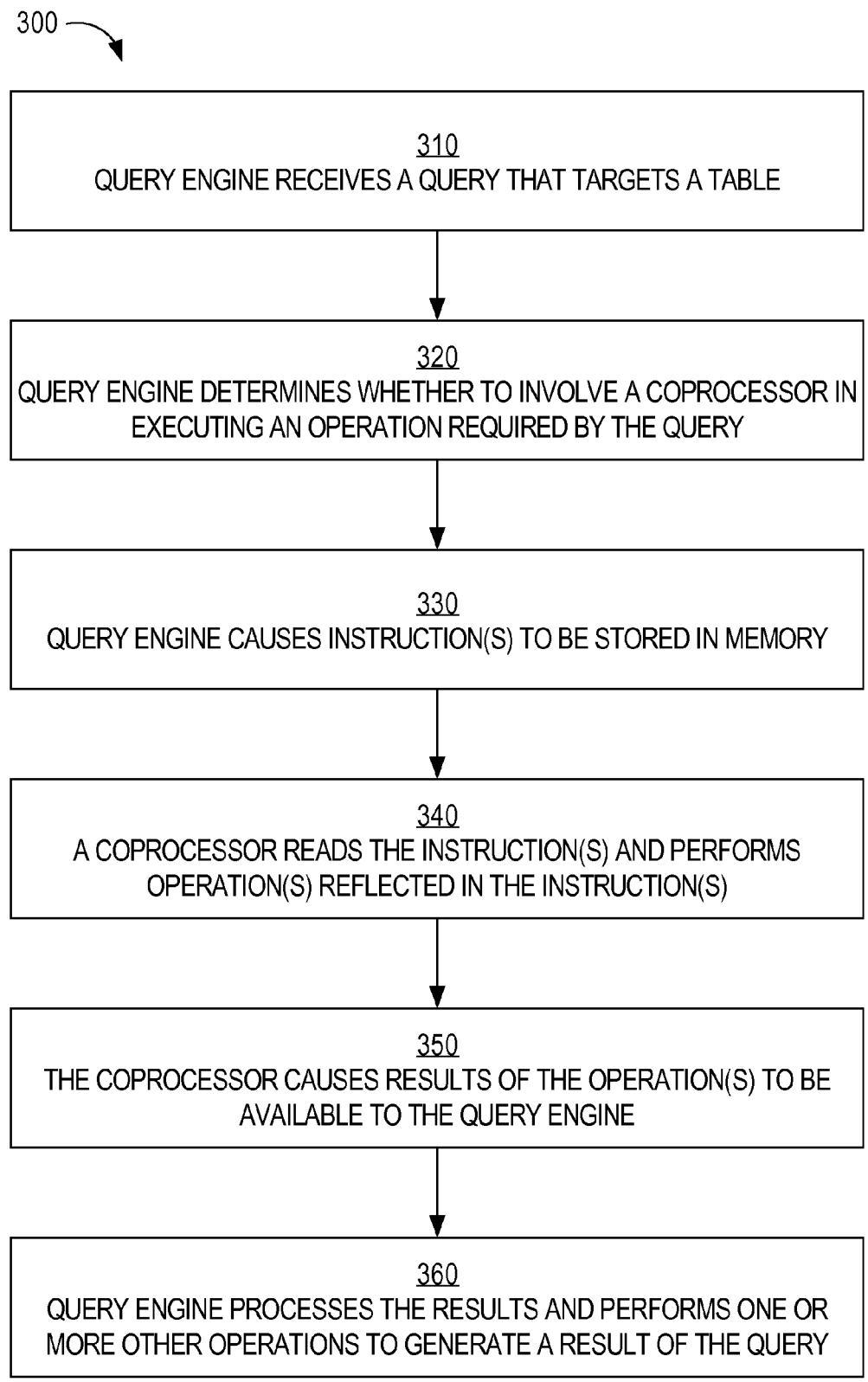
FIG. 3 is a flow diagram that depicts a process for processing a query, according to an embodiment.

FIG. 3 is a flow diagram that depicts a process 300 for processing a query that requires a scan operation, in an embodiment. At block 310, query execution engine 110 receives a query that targets one or more data objects, such as a table, and that requires a scan operation of at least one of the one or more data objects. For example, query execution engine 110 may process a SQL query to generate a rewritten query that includes one or more database operations, including a scan operation, that query execution engine 110 is configured to execute or to instruct one or more other software components to execute. Alternatively, another software component receives an original query and generates a rewritten query that query execution engine 110 is configured to process.

At block 320, query execution engine 110 determines, based on one or more criteria, whether to involve coprocessor 130 in processing the query. The one or more criteria may indicate whether the result was previously generated and cached, whether an index on the table exists and may be used to answer the query instead of scanning the table, the size of the table, etc. For example, if the size of the table that needs to be scanned is relatively small, then involving coprocessor 130 may require more work (e.g., in the form of usage of the general purpose microprocessor that is executing the instructions of query execution engine 110) or take more time than executing the query without involving coprocessor 130.

Additionally or alternatively, the one or more criteria may indicate a relative cost for processing the query (or rewritten query) in different ways. For example, query execution engine 110 may include a cost estimator component that estimates the cost of executing the query under different execution plans, such as using an index, scanning the table without using coprocessor 130, and scanning the table using coprocessor 130. Query execution engine 110 then selects the execution plan that is the least expensive in terms of cost. "Cost" may be based on one or more factors, such as CPU usage, memory usage, I/O usage, and network I/O usage.

If query execution engine 110 determines to involve coprocessor 130 in executing the query, then process 300 proceeds to block 330.

At block 330, query execution engine 110 sends, to hypervisor 120, an address of the one or more instructions, an address of the input data, and an address of where output data is to be stored. The one or more instructions may be in the form of a CCB that query execution engine 110 generates. Hypervisor 120 translates the addresses from virtual addresses into physical addresses and places the physical addresses into a command queue or buffer of coprocessor 130.

After query execution engine 110 causes the one or more instructions to be stored in memory (and, thus, are available for coprocessor 130 to read), query execution engine 110 may perform other tasks that are related to execution of the query or that are related to another query altogether. In this way, the operation(s) performed by coprocessor 130 are performed asynchronously to the tasks performed by query execution engine 110, which is executed by a general purpose microprocessor.

As noted above, computer system 100 may include multiple coprocessors. Thus, query execution engine 110 may send instructions (e.g., a CCB) to each of multiple coprocessors. In this way, a scan operation or a lookup operation may be divided up into multiple "mini" operations, allowed each coprocessor to perform a different "mini" operation. For example, a particular table may comprise 10,000 rows and there may be ten coprocessors. Query execution engine 110 may then generate ten different CCBs, each of which is similar to the other CCBs except that each CCB indicates a different address from which to access a different set of 1,000 rows from the particular table. In this way, the ten coprocessors operate in parallel on a different portion of the particular table.

Additionally or alternatively, block 330 involves query execution engine 110 selecting, based on one or more criteria, a subset of multiple coprocessors to send a CCB. For example, query execution engine 110 may only need three coprocessors of ten total coprocessors to each perform a scan operation (but on a different set of table data relative to each other coprocessor). The one or more criteria that query execution engine 110 uses to select one or more coprocessors may be a current load of each coprocessor, latency of each coprocessor, and/or processing history of each coprocessor. For example, query execution engine 110 selects the three coprocessors that are currently the least "loaded" or busy. The load of a coprocessor may be reflected in the number of commands that are in one or more command queues of the coprocessor. Thus, the more commands that are waiting to be processed by a particular coprocessor, the more loaded that particular coprocessor becomes.

At block 340, coprocessor 130 receives the one or more instructions and performs one or more operations reflected in the one or more instructions. For example, coprocessor 130 receives a CCB, determines that the type of operation(s) reflected in the CCB, reads in any data necessary to complete the operation(s), performs the operation(s), and (in block 350) causes results of the operation(s) to be sent to query execution engine 110. Execution of a command by coprocessor 130 may be triggered by a write, by query execution engine 110 (or one of its agents), to one or more internal registers of coprocessor 130.

Scan Operation

In an embodiment, the one or more instructions indicate a scan operation and one or more addresses where table data is stored. Coprocessor 130 retrieves the table data and performs comparisons between a value or range of values (specified in the one or more instructions) and the table data. Coprocessor 130 requests the table data from query execution engine 110 through memory (e.g., memory 140), which may be dynamic RAM in the system or cache memory on the chip. Table data may be stored in blocks, which may be relatively large, such as 64 KB or larger. Coprocessor 130 may access each of these blocks as a single dimensional array. In a columnar database, data is in a single dimensional array and easily readable by coprocessor 130. In a row major database, data may be first transposed into a column major format before the data is processed by coprocessor 130.

If the table data spans blocks that are discontinuous in memory, then coprocessor 130 separately requests each block (as a separate job). In such a scenario, query execution engine "stitches" together the results (generated by coprocessor 130) of each job. For example, in a row major database, the data will be strided and coprocessor 130 will select every Nth piece of data where N is specified in the command.

Coprocessor 130 may perform the comparisons "on-the-fly"; that is, as the table data is streamed to coprocessor 130. Once a data element in the table data is compared to a target value or a target range of values specified in the one or more instructions, coprocessor 130 may (immediately or eventually) overwrite the memory used to store that data element with a new data element from the table data.

Examples of types of comparison operations that coprocessor may be configured to perform include greater-than (>), less-than (<), equal (==), not equal (!=), greater-than-or-equal-to (>=), and less-than-or-equal-to (<=).

Semantic-Aware Compression

In an embodiment, coprocessor 130 is configured to operate on compressed data. Some data is compressed using one or more non-semantic-aware compression techniques, while other data may be compressed using one or more semantic-aware compression techniques. Data that is compressed using a non-semantic-aware compression technique requires decompression first before the decompressed data may be operated on. Data that is compressed using a semantic-aware compression technique may not need to be decompressed before an operation (for example, a number or string comparison) is performed. An example of a semantic-aware compression technique is run-length encoding (RLE).

RLE is a form of data compression in which runs of data (that is, sequences in which the same data value occurs in many consecutive data elements) are stored as a single data value and count, rather than as the original run. This is most useful on data that contains many such runs. For example, a column of a table may contain the following sequence department identifiers:

AAAAAABBBCCCCCCCCCDDDDDAAAA

Applying a RLE data compression algorithm to the above sequence might yield the following output: 6A3B8C5D4A. This run length code represents the original 26 characters in only 10 characters. In RLE, the longer the run of a single data value in an input sequence, the greater the compression.

Returning to block 340, table data may be run length encoded. Thus, the number of table data that needs to be read into coprocessor 130 and the number of comparisons that coprocessor 130 needs to perform against the run length encoded table data may be substantially less than if the table data is not run length encoded. Given the example above, instead of performing 26 comparisons (i.e., one for each of the 26 characters), coprocessor 130 would only have to perform 5 comparisons.

The result of performing a scan operation against run length encoded data may itself be run length encoded, which may be eventually processed by query execution engine 110. Given the example above, the result of determining whether a row of a particular table includes department identifier 'A' may be 6Y16N4Y, where 'Y' indicates a positive result of the determination and 'N' indicates a negative result of the determination.

Alternatively, the result of performing a scan operation against run length encoded data may not be run length encoded. Instead, the result may be "decompressed." Given the example above, the result of determining whether a row of a particular table includes department identifier 'A' may be YYYYYYNNNNNNNNNNNNNNNNNYYYY. In this embodiment, although a single comparison is performed for the character 'C' during the scan operation, coprocessor 130 generates eight negative indications (e.g., 'N' or '0') for that run length encoded data element.

Lookup Operation

SQL queries frequently need to cross reference multiple tables in a database. Processing such queries typically involves a set-intersect operation. Currently, set-intersect operations are performed by software running on general purpose microprocessors where the software utilizes a vector lookup (e.g., a Bloom filter lookup) when the cardinality of the table columns being joined is small. According to an embodiment, a vector lookup (or lookup operation) is implemented in hardware, which may be much fast than a software implementation.

Thus, in an embodiment, the one or more instructions (of block 330) indicate a lookup operation, one or more addresses where table data is stored, and one or more addresses where a lookup vector or array is stored. The one or more addresses where the table data (or lookup vector) is stored may be two addresses (e.g., a starting address and an ending address) or a single address with an offset. Coprocessor 130 causes the lookup vector and the table data to be sent to coprocessor 130 and, for each data element in the table data, performs a lookup of the data element in the lookup vector. In other words, coprocessor 130 uses the data element (or a hash of the data element) to identify a position in the lookup vector and retrieve data from the lookup vector at that position.

Example Query Requiring a Lookup Operation

An example of a query that may require a lookup operation is a query that requests information about "poor" people who live in "rich" zip codes. A "poor" person may be considered someone who makes less than $30,000 per year and a "rich" zip code may be considered a zip code where the median salary is over $100,000. In this example, coprocessor 130 requires data from at least two data objects: a lookup vector and a Person table. The lookup vector indicates (for example, with a single bit) whether a zip code is "rich" or not. The lookup vector may be pre-computed (i.e., that is, before the query is received) or may be computed in response to receiving the query.

The Person table contains information about numerous people where the table comprises at least three columns: one for each person's name, one for each person's salary, and one for each person's zip code. In one aspect, the data that indicates whether a zip code is rich or poor is a dimension table while the Person table that contains information about each person is a fact table. Dimension tables are typically much smaller than fact tables. In this example, the lookup vector may be generated based on the dimension table. Relatedly, the fact table may be represented by multiple data objects (e.g., tables): one data object may contain information about each person's salary and another data object may contain information about each person's zip code.

Lookup Vector

An example of a lookup vector is a Bloom filter, which is a probabilistic data structure that is used to test whether an element is a member of a set. While false positives are possible when utilizing a Bloom filter, false negatives are not. A Bloom filter is associated with one or more hash functions, each of which maps an element to one of the array positions in the Bloom filter.

However, a lookup vector need not be probabilistic. For example, if there are only 10,000 possible zip codes and each zip code is associated with a single bit, indicating whether that zip code is "rich," then the size of the lookup vector (e.g., 1.25 KB) may be small enough to fit the entire lookup vector in memory (e.g., SRAM) of coprocessor 130. Therefore, a probabilistic lookup vector is not necessary in order to reduce its size.

FIG. 4 is a block diagram that depicts a portion of an example lookup vector 400. Each position in lookup vector 400 is associated with a different zip code. In other words, a zip code is used to index into lookup vector 400. Each position in lookup vector 400 contains a single bit indicating if the corresponding zip is a "rich" zip code ('1') or a "poor" zip code ('0').

If a lookup vector is not capable of fitting entirely in memory of coprocessor 130, then (other than generating a probabilistic lookup vector) either (a) the lookup vector may be split up (or divided) such that coprocessor 130 reads in table data each time for each portion of the lookup vector or (b) a different coprocessor might read in table data once but only for a portion of the lookup vector that it stores, in an embodiment where there are multiple coprocessors.

In the former scenario, if coprocessor 130 can only fit, for example, ¼ of a lookup vector into its memory, then coprocessor 130 reads table data that indicates a person's zip code four times (i.e., once for each portion of the lookup vector that coprocessor 130 reads in). If a person's zip code is not identified in any one pass of the table data, then the result for that person may indicate a negative determination. The result of each pass of the table data may be one long array of bits, one for each person indicated in the Person table.

In the latter scenario, four different coprocessors may store a different quarter of the lookup vector and read in once table data that indicates a person's zip code and then perform a lookup into the lookup vector for each zip code reflected in the table data. Again, the result of a lookup operation from each coprocessor may be one long array of bits, one for each person indicated in the Person table.

Generating Results of Scan or Lookup Operation

In an embodiment, coprocessor 130 generates a specific output format as a result of performing the one or more operations reflected in the one or more instructions. An example of the specific output format is a bit vector, where each position in the bit vector indicates either a true or a false. For example, if "10" is a target value and the comparison is determining whether the target value is greater than a data value or data element from a table, then a result of the comparison would be (a) true if the data value is greater than 10 and (b) false if the data value is less than or equal to 10.

Each position in the vector corresponds to a data value or data element that was received from the input (e.g., table) data. For example, in the above lookup operation example, coprocessor 130 generates a bit vector that reflects "poor" people that live in "rich" zip codes. In order to generate the bit vector, coprocessor 130 reads in data from the zip code column of the Person table and determines, for each person indicated in the read-in data and based on the lookup vector, whether the person lives in a "rich" zip code. Each bit in the bit vector indicates whether a different person in the Person table lives in a "rich" zip code. Coprocessor 130 later passes the bit vector to the general purpose microprocessor, which uses the bit vector to identify persons that are also considered "poor." For example, for each person that lives in a rich zip code (as indicated in the bit vector), the general purpose microprocessor looks up a corresponding row in the Person table to determine if the person is "poor."

Because a bit vector is relatively small in size, processing of the bit vector by a general purpose microprocessor is relatively fast; much faster than the general purpose processor processing the input data directly. Furthermore, cache memory space required to store the bit vector is much less than cache memory space that would be required to store the input data (such as a large column of data).

Generating Results of Scan or Lookup Operation

Returning to process 300, at block 350, coprocessor 130 causes results of the scan operation (or the lookup operation)

to be available to query execution engine 110. Block 350 may involve coprocessor 130 sending the result of an operation to memory that is specified in the one or more instructions from query execution engine 110 that initiated the operation. For example, query execution engine 110 generated a CCB and indicated, in the CCB, that the result of the corresponding operation is to be sent to, for example, DRAM, shared L3 cache, or cache of a specific microprocessor (e.g., that executes query execution engine or that is different than the microprocessor that generated the original command(s)).

Block 350 may further involve coprocessor 130 setting a flag that, when set, indicates that the operation is complete. This flag setting acts as a signal to (1) hypervisor 120 to insert new requests into a command queue of coprocessor 130 and (2) query execution engine 110 to retrieve the results.

Alternatively, coprocessor 130 is programmed to always send the result of an operation to a specific memory component (whether RAM or cache) that is accessible to query execution engine 110.

Alternatively, instead of making the results of the scan operation available to query execution engine 110, coprocessor 130 sends the results to another coprocessor. As noted previously, computer system 100 may comprise multiple coprocessors. The multiple coprocessors may be connected in a series. Each connection between two coprocessors may include a FIFO buffer so that a "producing" coprocessor may generate results faster than a "consuming" coprocessor can process the results. Eventually, the last coprocessor in the "chain" sends results to a specified destination, such as in RAM or cache, that is accessible to query execution engine 110.

At block 360, query execution engine 110 processes the results and performs one or more other operations in order to generate a final result of the original query. While coprocessor 130 performs the scan or lookup operation, the general purpose microprocessor that executes query execution engine 110 may be idle or may be utilized by query execution engine 110 or another process altogether. For example, query execution engine 110 may perform one or more other operations that are required by the query or that are not be related in any way to the query, but rather to another query.

As an example of a scan operation, a query might request the IDs and prices of purchase orders that were initiated during a specific range of dates. In this example, coprocessor 130 performs a scan operation that involves reading in date information for multiple purchase orders, where the date information is reflected in a Purchase Order table. The result of the scan operation may be a series of bits (e.g., a bit vector) that each reflects whether a corresponding purchase order was initiated during the specified date range. Coprocessor 130 sends the result to memory that is accessible to query execution engine 110 and may notify query execution engine 110 of the completion of the scan operation by setting a flag that query execution engine 110 checks periodically. Query execution engine 110 then uses the bits to identify, in the Purchase Order table, the entries that correspond to those purchase orders that were initiated during the specified date range. Then, query execution engine 110 identifies the IDs and the prices in the identified entries and returns (e.g., displays) that information as a result of the query. The query may also specify that the result of the query is to be ordered by price in descending order. Thus, query execution engine 110 performs one or more operations after receiving the result of the scan operation performed by coprocessor 110.

Given the lookup operation example where the query is to identify "poor" people living in "rich" zip codes, in addition to instructing coprocessor 130 to perform a lookup operation, query execution engine 110 may also have instructed coprocessor 130 (or another coprocessor) to perform a scan operation on the Person table to identify all persons who have an annual salary that is less than $30,000. The result of the scan operation (like the result of the lookup operation) may be in the form of a series of bits (e.g., a bit vector) where each bit corresponds to a different person indicated in the Person table. In one embodiment, query execution engine 110 performs an AND operation on the result of the scan operation and the result of the lookup operation as inputs. Alternatively, coprocessor 130 (or another coprocessor) may be programmed to perform the AND operation. In this embodiment, query execution engine 110 may create another CCB where the operands include a (e.g., virtual) address to the result of the lookup operation and an address to the result of the scan operation.

As described previously, the size of a lookup vector may not fit entirely in memory of coprocessor 130 at one time. In one of the two scenarios described previously, the lookup vector is divided into four "mini"-vectors and coprocessor 130 operates on each mini-vector separately, thus requiring coprocessor 130 to read in zip code data (from the Person table) for each person four times. The total result produced by coprocessor 130 executing this lookup operation may comprise four separate array of bits, which are eventually OR'd together to yield a single array of bits (again, one for each person indicated in the Person table). This OR'ing step (which may comprise three OR operations) may be performed by query execution engine 110. Alternatively, coprocessor 130 may be programmed to perform the OR operations.

In the other of the two scenarios, query execution engine 110 causes four different coprocessors to perform a lookup operation using different portions of the lookup vector. Then, the result from one of the coprocessors is OR'd with the result from each of the other coprocessors to yield a single array of bits (one for each person indicated in the Person table). Again, this OR'ing step may be performed by query execution engine 110 or by one of the coprocessors.

Once query execution engine 110 determines which people live in "rich" zip codes, query execution engine 110 uses that information to determine those people who are also considered "poor," as indicated above.

While the above description refers to performing either a scan operation or a lookup operation, embodiments may involve one coprocessor performing scan operation for a particular query while another coprocessor is performing a lookup operation for the particular query. Thus, multiple coprocessors may execute simultaneously for the same query but perform different operations.

An advantage of embodiments described herein is that a general purpose microprocessor may offload data-intensive operations to one or more coprocessors that are separate from the microprocessor in order to free up usage of the microprocessor for other tasks. Thus, the coprocessor(s) may operate asynchronously with respect to the query processing software that causes the coprocessors to perform the operations. Additionally, the one or more coprocessors may perform those operations much faster than the general purpose microprocessor executing the query processing software.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
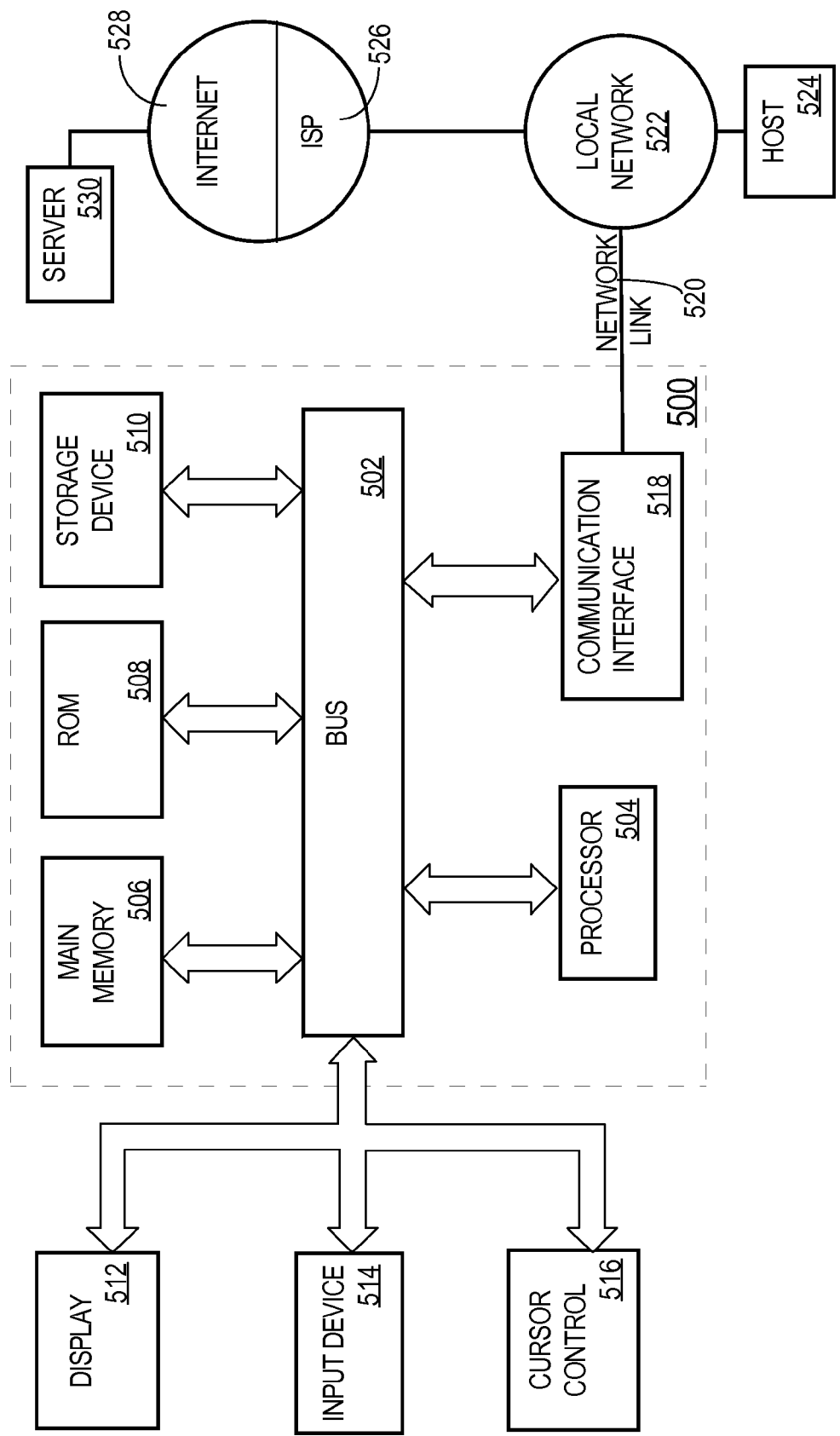
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A machine-implemented method for processing a query, comprising:
   determining, by a microprocessor, that execution of the query involves a scan operation;
   in response to determining that execution of the query involves a scan operation,
      generating, by the microprocessor, a scan operation command that includes, as parameters of the scan operation command, address data that is used to identify input data to be read by a coprocessor and one or more values that are used to compare against the input data;
   wherein the microprocessor is separate from the coprocessor;
   causing, by the microprocessor, the scan operation command to be stored in memory;
   processing, by the coprocessor, the scan operation command by:
      reading the scan operation command from the memory;
      causing the input data to be read from a location that is indicated by the address data;
      performing a comparison between the input data with the one or more values;
      generating a result data based on the comparison;
      causing the result data to be stored.

2. The method of claim 1, wherein:
   the scan operation command further includes operation type data that indicates a type of operation to perform;
   processing the scan operation command further by first identifying the operation type data to determine the type of operation.

3. The method of claim 2, further comprising:
   using the operation type data to determine logic that is used to interpret the input data;
   converting the input data from a first data type to a second data type that is different than the first data type.

4. The method of claim 1, wherein:
   the input data comprises value data and count data;
   an input value in the value data corresponds to data elements, the number of which is indicated by a count value in the count data;
   comparing the input data with the one or more values comprises comparing the input value with the one or more values;
   generating the result data comprises generating a result indication that indicates whether the input value satisfies the one or more values;
   generating the result data is performed without comparing the input value with the one or more values a number of times indicated by the count value.

5. The method of claim 1, wherein the scan operation command further includes destination data that indicates where the result data is to be stored.

6. The method of claim 1, wherein causing the result data to be stored comprises causing the result data to be stored in a cache of the microprocessor.

7. The method of claim 1, wherein causing the result data to be stored further comprises causing, to be stored, a completion status that indicates that the scan operation command has been performed.

8. The method of claim 1, wherein:
   determining that execution of the query involves a plurality of operations that includes the scan operation and one or more other operations;
   the method further comprising:
      retrieving the result data from storage;
      after retrieving the result data from the storage, processing the one or more other operations that require the result data as input to the one or more other operations.

9. The method of claim 1, wherein:
   the coprocessor is a first coprocessor of a plurality of coprocessors that are connected in a series;
   causing the result data to be stored comprises causing the result data to be sent to a buffer of a second coprocessor of the plurality of coprocessors;
   the method further comprising:
      reading, by the second coprocessor, the result data from the buffer while the first coprocessor is executing a portion of the query, and
      based on the result data, generating, by the second coprocessor, second result data.

10. The method of claim 1, wherein:
    generating the scan operation command comprises generating a plurality of scan operation commands that includes the scan operation command;
    causing the scan operation command to be stored in memory comprises, for each scan operation command of the plurality of scan operation commands, causing said each scan operation command to be stored in the memory;
    each coprocessor of a plurality of coprocessors selects a scan operation command of the plurality of scan operation commands.

11. The method of claim 1, wherein:
    the address data included in the scan operation command includes one or more virtual addresses;
    the method further comprising causing the one or more virtual addresses to be replaced with one or more physical addresses that the coprocessor uses to read the input data.

12. The method of claim 1, further comprising determining whether one or more criteria are satisfied, wherein causing the scan operation command to be sent to the coprocessor is only performed if the one or more criteria are satisfied.

13. The method of claim 12, wherein the one or more criteria is based on an amount of data that needs to be read in by the coprocessor to perform the scan operation.

14. The method of claim 1, wherein:
the one or more values comprises a plurality of data elements;
comparing the input data with the one or more values comprises comparing the input data with the plurality of data elements simultaneously.

15. The method of claim 1, wherein generating the result data based on the comparison comprises generating a bit vector, wherein each bit in the bit vector indicates whether a comparison yielded a true or false.

16. A coprocessor that is configured to perform the steps of:
reading a scan operation command (1) that was generated by a microprocessor, that is separate from the coprocessor and that executes instructions related to query processing, in response to the microprocessor determining that a query includes a scan operation; and (2) that includes, as parameters of the scan operation command, address data that is used to identify input data to be read by the coprocessor and one or more values that are used to compare against the input data;
causing the input data to be read from a location that is indicated by the address data;
performing a comparison between the input data and the one or more values;
generating a result data based on the comparison;
causing the microprocessor to be notified of the result data.

17. The coprocessor of claim 16, wherein:
the scan operation command further includes operation type data that indicates a type of operation to perform;
the coprocessor is further configured to perform the step of identifying the operation type data to determine the type of operation.

18. The coprocessor of claim 17, wherein the coprocessor is further configured to perform the steps of:
using the operation type data to determine logic that is used to interpret the input data;
converting the input data from a first data type to a second data type that is different than the first data type.

19. The coprocessor of claim 16, wherein the scan operation command further includes destination data that indicates where the result data is to be stored.

20. The coprocessor of claim 16, wherein causing the result data to be stored comprises causing the result data to be stored in a cache of the microprocessor.

21. The coprocessor of claim 16, wherein:
the input data comprises value data and count data;
an input value in the value data corresponds to data elements, the number of which is indicated by a count value in the count data;
comparing the input data with the one or more values comprises comparing the input value with the one or more values;
generating the result data comprises generating a result indication that indicates whether the input value satisfies the one or more values;
generating the result data is performed without comparing the input value with the one or more values a number of times indicated by the count value.

22. The coprocessor of claim 16, wherein:
the coprocessor is a first coprocessor of a plurality of coprocessors that are connected in a series;
causing the result data to be stored comprises causing the result data to be sent to a buffer of a second coprocessor of the plurality of coprocessors.

23. The coprocessor of claim 16, wherein:
the address data included in the scan operation command includes one or more virtual addresses;
the coprocessor is further configured to perform the step of causing the one or more virtual addresses to be replaced with one or more physical addresses that the coprocessor uses to read the input data.

24. The coprocessor of claim 16, wherein:
the one or more values comprises a plurality of data elements;
comparing the input data with the one or more values comprises comparing the input data with the plurality of data elements simultaneously.

25. The coprocessor of claim 16, wherein generating the result data based on the comparison comprises generating a bit vector, wherein each bit in the bit vector indicates whether a comparison yielded a true or false.

* * * * *

UNITED STATES PATENT AND TRADEMARK OFFICE
CERTIFICATE OF CORRECTION

| | | |
|---|---|---|
| PATENT NO. | : 9,063,974 B2 | Page 1 of 1 |
| APPLICATION NO. | : 13/778009 | |
| DATED | : June 23, 2015 | |
| INVENTOR(S) | : Aingaran et al. | |

It is certified that error appears in the above-identified patent and that said Letters Patent is hereby corrected as shown below:

On the title page item [56]

On page 2, column 2, line 8, delete "Tighly-" and insert -- Tightly- --, therefor.

On page 2, column 2, line 9, delete "Reconfigureable" and insert -- Reconfigurable --, therefor.

Signed and Sealed this
Eighth Day of March, 2016

Michelle K. Lee
*Director of the United States Patent and Trademark Office*